(12) United States Patent  
Mizumi et al.

(10) Patent No.: US 8,029,230 B2
(45) Date of Patent: *Oct. 4, 2011

(54) TURBINE EXHAUST SYSTEM AND METHOD FOR MODIFYING THE SAME

(75) Inventors: Shunsuke Mizumi, Hitachinaka (JP); Ryuichiro Iwano, Hitachi (JP); Koji Ishibashi, Hitachi (JP); Going Won Lee, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 12 days.

This patent is subject to a terminal disclaimer.

(21) Appl. No.: 12/550,434

(22) Filed: Aug. 31, 2009

(65) Prior Publication Data

US 2009/0308075 A1    Dec. 17, 2009

Related U.S. Application Data

(63) Continuation of application No. 11/346,279, filed on Feb. 3, 2006, now Pat. No. 7,600,962.

(30) Foreign Application Priority Data

Mar. 31, 2005  (JP) ................................. 2005-101376

(51) Int. Cl.
*F04D 29/54* (2006.01)
*F01D 9/02* (2006.01)

(52) U.S. Cl. .......... 415/1; 415/207; 415/211.2; 415/225

(58) Field of Classification Search .............. 415/1, 207, 415/211.2, 220, 224.5, 225, 226, 914; 29/401.1, 29/889.1

See application file for complete search history.

(56) References Cited

U.S. PATENT DOCUMENTS

| | | | |
|---|---|---|---|
| 3,149,470 | A | 9/1964 | Herzog |
| 4,326,832 | A | 4/1982 | Ikeda et al. |
| 5,257,906 | A | 11/1993 | Gray et al. |
| 5,518,366 | A | 5/1996 | Gray |
| 5,992,152 | A | 11/1999 | Weres et al. |
| 6,261,055 | B1 | 7/2001 | Owczarek |
| 6,419,448 | B1 | 7/2002 | Owczarek |
| 6,698,205 | B2 | 3/2004 | Tarelin et al. |

FOREIGN PATENT DOCUMENTS

| | | |
|---|---|---|
| JP | 49-104009 | 10/1974 |
| JP | 52-93809 | 8/1977 |

*Primary Examiner* — Justine R Yu
*Assistant Examiner* — Sean J Younger
(74) *Attorney, Agent, or Firm* — Mattingly & Malur, P.C.

(57) ABSTRACT

A turbine exhaust system includes an exhaust hood inner casing that involves the turbine rotor; an exhaust hood outer casing that forms an exhaust hood, together with the exhaust hood inner casing; a flow guide that forms an annular diffuser flow path; and exhaust hood upper part flow guides each of which serves as means for separating annular plane upper part exhaust steam within a range including a vertical upward flow out of exhaust steam radially discharging from the flow guide into the exhaust hood, from other exhaust steam, to thereby introduce the separated steam to the condenser, wherein exhaust steam introduction-side end faces thereof are located further toward the upper side than the horizontal plane containing the central axis of the turbine rotor.

8 Claims, 7 Drawing Sheets

TURBINE EXHAUST SYSTEM AND METHOD FOR MODIFYING THE SAME

CROSS-REFERENCES TO RELATED APPLICATIONS

This application is a continuation of U.S. patent application Ser. No. 11/346,279, filed Feb. 3, 2006, which is incorporated by reference in its entirety herein and which claims priority to Japanese Application No. 2005-101376, filed Mar. 31, 2005.

BACKGROUND OF THE INVENTION

1. Field of the Invention

The present invention relates to a turbine exhaust system for introducing, to a condenser, exhaust steam after having driven a turbine rotor, and a method for modifying the same.

2. Description of the Related Art

In a steam turbine plant having a condenser, steam (exhaust steam) after having conducted work inside a turbine is generally condensed by a condenser and circulated after having being subjected to a pressure recovery through an exhaust hood. The inner pressure of the condenser is principally defined by a temperature of seawater serving as cooling water and a flow rate thereof. Therefore, the larger the extent of pressure recovery in the exhaust hood, the lower is the back-pressure at a blade path exit plane. Correspondingly, work load on the turbine increases, and power generation obtained by driving the turbine increases. Hence, the pressure recovery performance of the exhaust hood has a large effect on turbine plant performance.

As an example of this type of exhaust hood, JP.A 52-93809 discloses an exhaust hood in which an exhaust hood outer casing is divided into an upper half casing and a lower half casing, with the neighborhood of the horizontal plane containing the central axis of the turbine rotor as a boundary, and in which a flow path, to the condenser, of exhaust steam discharged into the upper half casing and a flow path thereto of steam discharged into the lower half casing are separated from each other by a partition wall. According to this conventional art, by dividing the exhaust steam discharged into the upper half casing and that discharged into the lower half casing by the partition wall to divide a flow amount of exhaust steam into two, the flow proportion of exhaust steam flowing in the exhaust hood is properly adjusted, thereby promising to improve performance of the exhaust hood.

SUMMARY OF THE INVENTION

The energy loss of exhaust steam flow introduced from the flow guide to the condenser is, generally speaking, maximum in a vertical upward flow that flows in the direction opposite to the aforementioned flow from the flow guide to the condenser. The energy loss decreases as the discharge direction moves to the peripheral directions (left and right) around the vertical upward flow, as viewed from the rotor axis direction, until it reaches a minimum in vertical downward flow. One of the causes of such energy loss phenomenon is that, when heading to the condenser downward, the downward flow makes no abrupt turnabout and hence shows a low-turbulence, stable behavior, whereas, as the steam flow gets closer to an upward flow, it bounces off the exhaust hood outer casing and exhaust hood inner casing over and over again while gradually flowing downward, so that it is further supplied with a vortical component, resulting in a high-turbulence flow. Taking such behavior of exhaust steam into consideration, it is possible to inhibit a high-turbulence-flow from affecting other flows, by separating, as another line, the high-turbulence flow causing a vortical flow and/or flow separation responsible for loss. This allows a reduction in the flow loss of the total exhaust steam, leading to improved pressure recovery performance of the exhaust hood.

However, all exhaust flow in the upper half casing is not necessarily turbulent flow. Therefore, as in the above-described conventional art, dividing exhaust steam flow in the exhaust hood into equal parts by arranging a partition wall in the vicinity of the horizontal plane containing the central axis of the turbine rotor, with consideration given to the flow proportion, would involve a possibility that a flow in no small part is mingled with a high-turbulence flow to thereby significantly increase in a flow loss.

Accordingly, the present invention is directed to a turbine exhaust system capable of more improving pressure recovery performance by properly separating a high-loss flow out of exhaust steam heading from the flow guide toward the condenser, and a method for modifying the same.

To this end, when one part of the exhaust steam discharged from a position located further toward the upper side than an horizontal plane containing the central axis of a turbine rotor axis in a final stage moving blade exit annular plane, is defined as annular plane upper part exhaust steam, the turbine exhaust system according to the present invention is configured so as to separate this annular plane upper part exhaust steam from other exhaust steam to introduce it to a condenser through separate flow paths in order to prevent the annular plane upper part exhaust steam from interfering with the other exhaust steam.

According to the present invention, pressure recovery performance can be more enhanced by properly separating a flow that is high in vortical flow loss, out of exhaust steam flow heading from the flow guide to the condenser.

DESCRIPTION OF THE PREFERRED EMBODIMENTS

Hereinafter, embodiments of the turbine exhaust system according to the present invention will be described with reference to the accompanying drawings.

Figure 1:
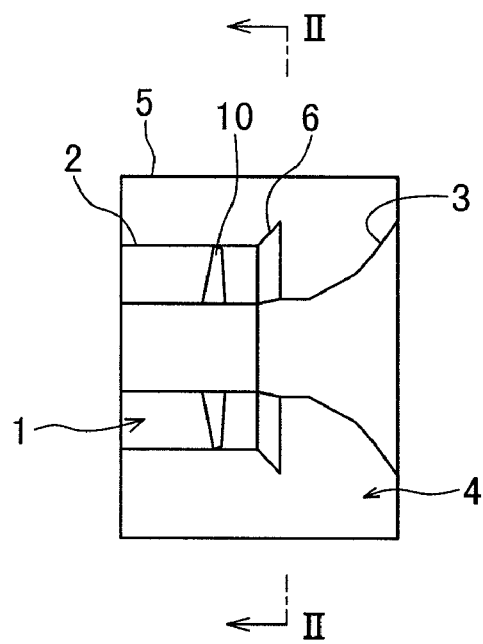
FIG. 1 is a schematic sectional side view showing the basic structure of a turbine exhaust system.
Figure 2:
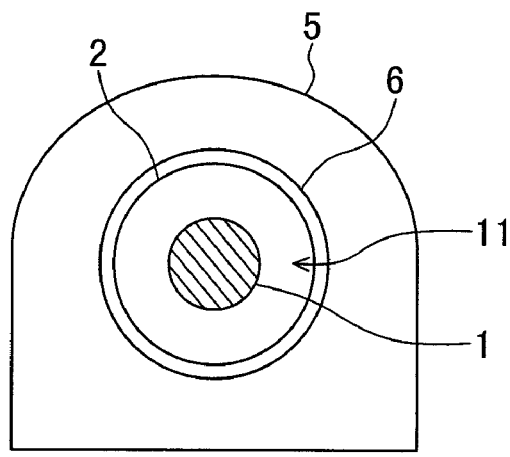
FIG. 2 is a cross-sectional view taken along a line II-II in FIG. 1.

FIG. 1 is a schematic sectional side view showing the basic structure of a turbine exhaust system, and FIG. 2 is a sectional view taken along a line II-II in FIG. 1.

The illustrated turbine exhaust system is for introducing, to a condenser downward (not shown), exhaust steam after having driven a turbine rotor 1. This turbine exhaust system includes an exhaust hood inner casing 2 involving a turbine rotor 1; a bearing cone 3 covering a bearing (not shown) of the turbine rotor 1; a exhaust hood outer casing 5 forming an exhaust hood 4 connecting with the condenser, together with the exhaust hood inner casing 2 and the bearing cone 3; and a flow guide 6 forming an annular diffuser flow path between the bearing cone 3 and the flow guide 6.

The exhaust hood inner casing 2 has stationary blades (not shown) supported by diaphragm outer rings and diaphragm inner rings, on the inner peripheral side thereof. The stationary blades constitute each turbine stage together with corresponding moving blades installed on the turbine rotor 1 (FIG. 1 shows only a final stage moving blade 10). Typically, on the inner peripheral side of the exhaust hood inner casing 2, there are annually provided diaphragms (not shown) serving as roots for the stationary blades. Each diaphragm annually arranged on the stationary side and the turbine rotor 1 on the rotating side are mutually opposed with an appropriate clearance gap therebetween.

The exhaust hood outer casing 5 covers the exhaust hood inner casing 2 and the bearing cone 3, and is generally divided up and down at a height in the vicinity of the horizontal plane containing the central axis of the turbine rotor 1. As shown in FIG. 2, the outer wall surface of the upper half casing out of the exhaust hood outer casing 5 is formed as an arcuate shape in a cross-section in the ceiling portion thereof. On the other hand, the outer wall surface of the lower half casing is formed as a rectangular frame in a horizontal cross-section. The above-described exhaust hood 4 is formed by being surrounded by the exhaust hood outer casing 5, the exhaust hood inner casing 2, and the bearing cone 3.

The bearing cone 3 is arranged contiguously to the inner peripheral part of an exit annular plane 11 of the final stage moving blade 10 on the turbine rotor 1. The flow guide 6 is disposed contiguously to the outer periphery of the final stage moving blade exit annular plane 11 so as to surround the outer peripheral side of the bearing cone 3. An annular diffuser flow path that is formed between the flow guide 6 and the bearing cone 3 discharges, to the exhaust hood 4, exhaust steam that has driven the turbine rotor 1 and passed the exit annular plane 11 of the final stage moving blade 10. This annular diffuser flow path formed between the flow guide 6 and the bearing cone 3 is gradually increased in cross-sectional area, so that exhaust steam is decelerated when passing through this diffuser flow path, and energy corresponding to the deceleration is converted into pressure to thereby recover exhaust pressure.

Exhaust steam discharged from the flow guide 6 toward the exhaust hood 4 spreads in a radial manner. Exhaust steam discharged from the lower half side of the flow guide 6 straightly heads toward the condenser downward without so changing the travel direction thereof, or after once colliding against the exhaust hood outer casing 5, it bounces thereof and heads to the condenser downward. On the other hand, exhaust steam discharged from the upper half side of the flow guide 6 heads toward the condenser while abruptly turning about the travel direction thereof, so that it causes flow separation or vortical flow, and thereby the total loss of flow is prone to become very large. In particular, a part of this flow bounces off the exhaust hood outer casing 5 after having passed the flow guide 6, and further it collides against the exhaust hood inner casing 2. The smaller an approach angle formed between the exhaust flow and a vertical line passing through the center of the turbine rotor 1, the more noticeable is this phenomenon. The exhaust flow travels back and forth between the exhaust hood outer casing 5 and the exhaust hood inner casing 2 over and over again until it is introduced into the condenser, so that it is supplied with a vortical component along a meridian plane (plane containing the central axis of the turbine), resulting in a vortical flow. This accelerates the tendency to increase flow loss.

The cause and influence of the occurrence of such strong vortical flow caused by flow from an upper part of the annular plane are new findings obtained by recent detailed analysis based on three-dimensional computational fluid dynamics. The reason why the above-described cause and influence has hitherto hardly been clarified is because the mechanism of the occurrence of such strong vortical flow is not recognized until the performance of the diffuser in the exhaust hood is improved and flow inside the exhaust hood is controlled to constitute a layered structure that is orderly to a certain extent.

The largest feature of the present invention is to improve pressure recovery performance of the turbine exhaust system to achieve an enhancement of performance of an overall steam turbine plant, by separating such high-turbulence and high-loss exhaust flow (hereinafter referred to as "annular plane upper part exhaust steam") from low-turbulence and low-loss exhaust flow (hereinafter referred to as the "other exhaust steam"), to inhibit the annular plane upper part exhaust steam from interfering with the other exhaust steam, so as to prevent the other exhaust steam from increasing in flow loss under the influence of the annular plane upper part exhaust steam.

In the present invention, the broadest definition of the "annular plane upper part exhaust steam" is exhaust steam that flows within a range containing vertical upward flow out of exhaust steam radially discharged from the flow guide 6 into the exhaust hood 4. This is a part of exhaust steam discharged from the flow guide 6 into an exhaust hood portion located further toward the upper side than the horizontal plane containing the central axis of the turbine rotor 1. The "other exhaust steam" refers to exhaust steam obtained by subtracting the annular plane upper part exhaust steam from the total exhaust steam discharged from the flow guide 6 into the exhaust hood 4.

Figure 7:
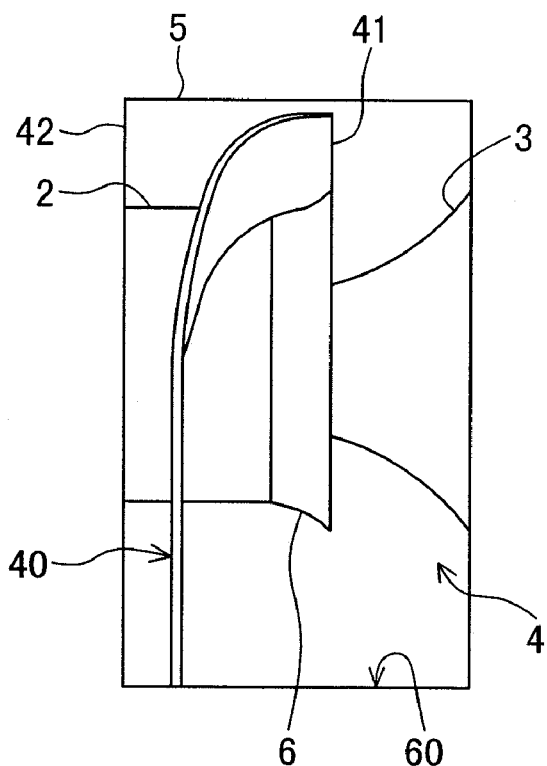
FIG. 7 is a perspective side view showing the detailed construction of a turbine exhaust system according to the first embodiment of the present invention.
Figure 8:
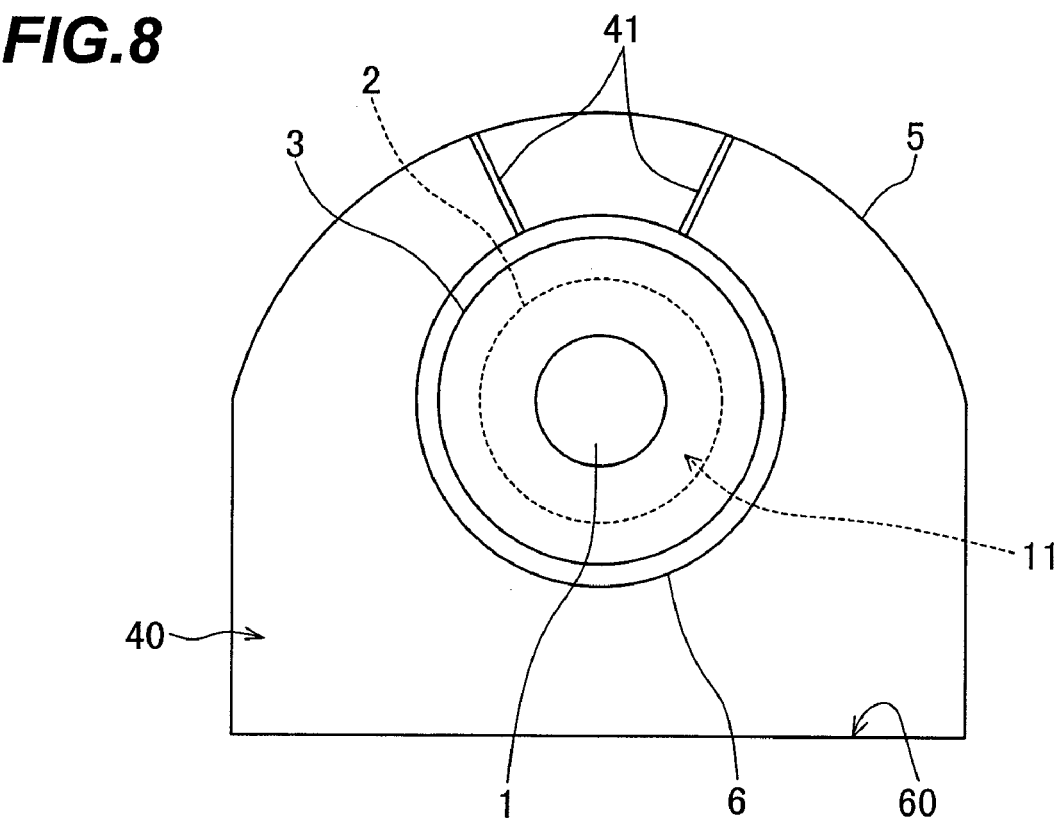
FIG. 8 is a perspective front view showing the detailed construction of the turbine exhaust system according to the first embodiment of the present invention.
Figure 9:
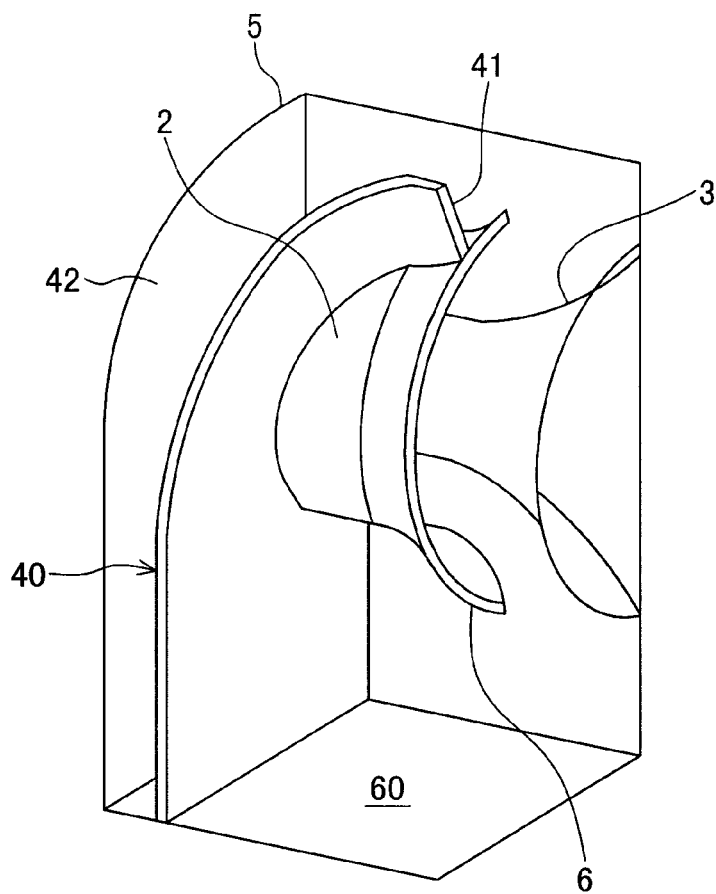
FIG. 9 is a perspective view showing the detailed construction of a half part of the turbine exhaust system according to the first embodiment of the present invention, the half part being obtained by dividing the turbine by a vertical plane containing the central axis of the turbine.

The turbine exhaust system according to this embodiment provides means for introducing the annular plane upper part exhaust steam to the condenser by separating it from the other exhaust steam, that is, exhaust upper part flow guides in each of which an exhaust steam introduction-side end face thereof is arranged as a separation boundary between the annular plane upper part exhaust steam and the other exhaust steam (for details of an example thereof, refer to FIGS. 7 to 9 to be described below). The separation boundaries between the annular plane upper part exhaust steam and the other exhaust steam, that is, the exhaust steam introduction-side end faces are located further toward the upper side than the horizontal plane containing the central axis of the turbine rotor.

Figure 3:
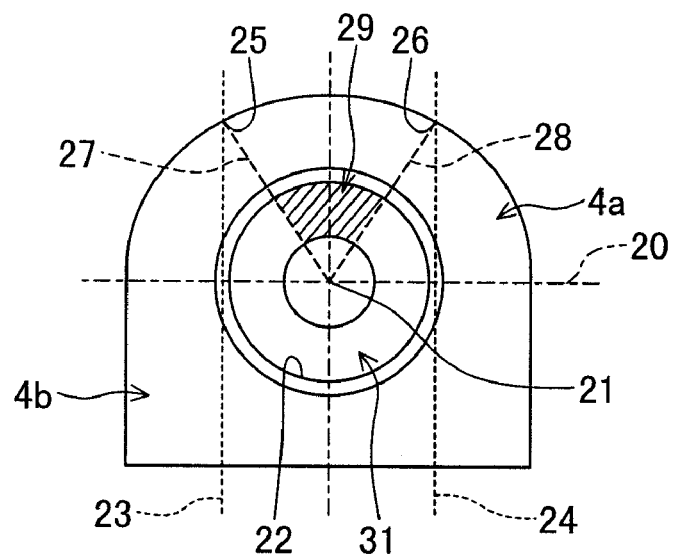
FIG. 3 is a specific example of a discharge range of annular plane upper part exhaust steam in an exhaust hood.

A more preferable definition of the "annular plane upper part exhaust steam" is exhaust steam of which the main stream interferes with the outer periphery of the exhaust hood inner casing 2 after having bounced off the exhaust hood outer casing 5, out of exhaust steam discharged from the flow guide 6 into the exhaust hood 4. FIG. 3 explains a specific example of a discharge range of the annular plane upper part exhaust steam in this case.

Figure 4:
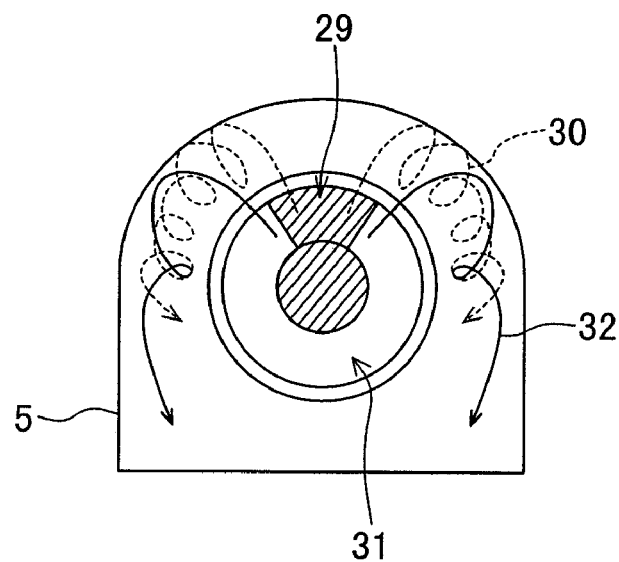
FIG. 4 is an explanatory view of behavior of exhaust steam in the exhaust hood.

In FIG. 3, let the exhaust hood 4 located further toward the upper side than the horizontal plane 20 containing the central axis of the turbine rotor be an exhaust hood upper part 4a, and let the exhaust hood 4 located further toward the lower side than that be an exhaust hood lower part 4b. Vertical planes 23 and 24 that are tangent to the outer peripheral part 22 of the final stage moving blade exit annular plane 11 and parallel to the central axis 21 of the turbine rotor 1 intersect the exhaust hood outer casing 5 on the upper half side, on intersection lines 25 and 26 between the vertical planes 23 and 24 and the exhaust hood outer casing 5, respectively. In this example, it is assumed that two separation boundaries between the annular plane upper part exhaust steam and the other exhaust steam exist, for example, between the flow guide 6 and the exhaust hood outer casing 5, along a plane 27 containing the intersection line 25 and the central axis 21, and a plane 28 containing the intersection line 26 and the central axis 21, respectively. As shown in FIG. 4, in the exhaust hood upper half part 4a, let the region between the planes 27 and 28 in the final stage moving blade exit annular plane 11 be an annular plane upper part 29, and let exhaust steam flowing into the region between the planes 27 and 28 in the exhaust hood upper half part 4a be annular plane upper part exhaust steam 30. Here, exhaust steam discharged from the region 31 other than the annular plane upper part 29 of the final stage moving blade exit annular plane 11 is the other exhaust steam 32, which is exhaust steam other than the annular plane upper part exhaust steam 30. Out of exhaust steam radially discharging from the final stage moving blade exit annular plane 11, exhaust flow that has bounced off the exhaust hood outer casing 5 attempts to flow in a substantially vertically downward direction, so that the mainstream of the annular plane upper part exhaust steam 30 that bounces off the exhaust hood outer casing 5 between the vertical planes 23 and 24, tends to collide against the exhaust hood inner casing 2.

Although FIG. 3 illustrates the case where exhaust hood is formed in a bilaterally symmetrical manner, with a vertical plane containing the central axis 21 as a boundary, the definition on the discharge range of the annular plane upper part exhaust steam in this example can also be applied to a bilaterally asymmetrical exhaust hood.

Figure 5:
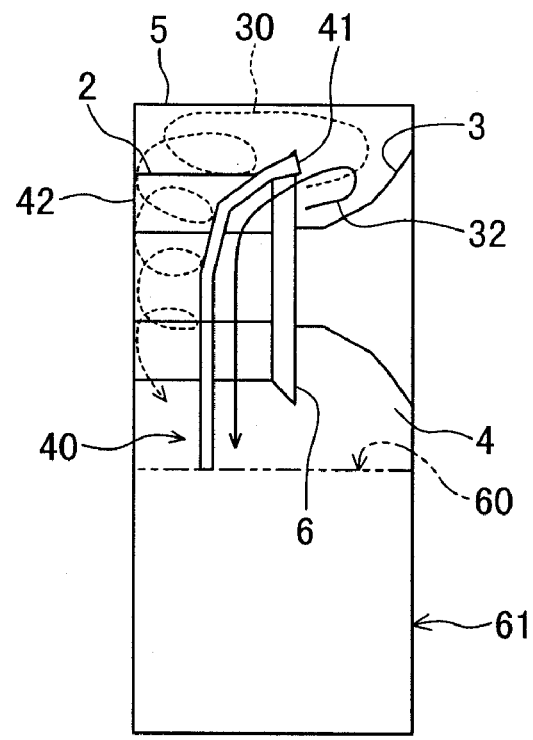
FIG. 5 is a schematic side view showing an outline of the construction of a turbine exhaust system according to a first embodiment of the present invention, and corresponding flow profiles of exhaust steam.
Figure 6:
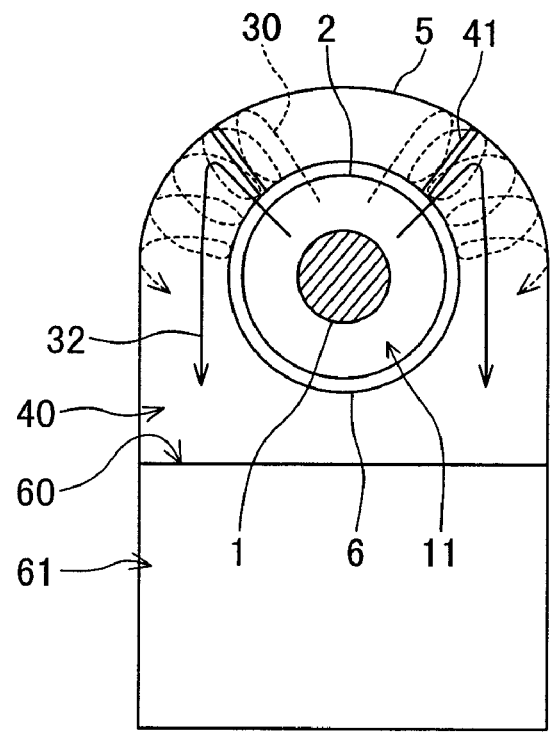
FIG. 6 is a schematic front view showing an outline of the construction of the turbine exhaust system according to the first embodiment of the present invention, and corresponding flow profiles of exhaust steam.

FIGS. 5 and 6 are each a schematic view showing an outline of the construction of the turbine exhaust system according to the first embodiment of the present invention, and corresponding flow profiles of exhaust steam. Here, FIG. 5 is a diagram as viewed from the same direction as in FIG. 1, wherein and the inside of the exhaust hood outer casing 5 is perspectively illustrated, and FIG. 6 is a diagram as viewed from the same cross-section as in FIG. 2. In these drawings, the same parts as those in FIGS. 1 to 4 are designated by the same reference numerals, and descriptions thereof are omitted.

As shown in FIGS. 5 and 6, in this embodiment, there are provided partition walls (exhaust hood upper part flow guides) 40 for dividing an exhaust flow path between the exhaust hood outer casing 5 and the flow guide 6 which flow path leads to the condenser, into two exhaust flow path lines that allow the annular plane upper part exhaust steam 30 and the other exhaust steam 32 to pass through, individually, in order to prevent the annular plane upper part exhaust steam 30 from interfering with the other exhaust steam 32.

FIG. 7 is a perspective side view showing the detailed construction of a turbine exhaust system according to this embodiment of the present invention; FIG. 8 is a perspective front view thereof; and FIG. 9 is a perspective view of a half part thereof, the half part being obtained by dividing the turbine by a vertical plane containing the central axis of the turbine. In these drawings, the same parts as those in FIGS. 1 to 6 are designated by the same reference numerals, and descriptions thereof are omitted.

As can be seen from FIGS. 7 to 9 together with FIGS. 5 and 6, each of the exhaust hood upper part flow guides 40 is arranged along the outer peripheral part of the flow guide 6 and the exhaust hood inner casing 2, and configured so as to extend toward the exhaust hood inner casing 2 from the flow guide 6, with the exhaust steam introduction-side end face 41 as a starting end, and thereafter bend in a downward direction. The exhaust steam introduction-side end faces 41 are disposed along the planes 27 and 28 functioning as separation boundaries in FIG. 3. In the exhaust hood upper half part 4a, there are provided two exhaust hood upper part flow guides 40, but they connect with each other at the exhaust hood lower half part 4b. The exhaust hood upper part flow guides 40 are arranged so as to perfectly divide a space between the flow guide 6 and the exhaust hood inner casing 2, and the exhaust hood outer casing 5, and entirely covers surroundings of the exhaust hood inner casing 2 in the exhaust hood lower half part 4b. Therefore, as viewed as a whole, the exhaust hood upper part flow guides 40 could be considered as a single flow guide.

With these features, the annular plane upper part exhaust steam 30 is discharged from the annular plane upper part 29 into the exhaust hood 4, and after having gone over the exhaust hood upper part flow guides 40 from between the two exhaust steam introduction-side end faces 41, flows into a flow path on the side of the rear end face 42 (left side in FIG. 5) of the exhaust hood outer casing 5. In contrast, the other exhaust steam 32 discharged from the region 31 other than the annular plane upper part 29 is introduced in the downward direction while being guided by the exhaust hood upper part flow guides 40 without going over the exhaust hood upper part flow guides 40.

The annular plane upper part exhaust steam 30, separated from the other exhaust steam 32 becomes a flow with a vortical flow component (secondary flow component) reduced, by flowing through a slightly flattened cross-sectional flow path formed by the exhaust hood upper part flow guides 40 and the exhaust hood outer casing 5. Also, since the annular plane upper part exhaust steam 30 is smoothly introduced into the slightly flattened cross-sectional flow path by the exhaust hood upper part flow guides 40, it is possible to inhibit an abrupt turnabout of flow and reduce the length of the slightly flattened cross-sectional flow path required for rectification in the mainstream direction. The annular plane upper part exhaust steam 30 with the vortical flow component reduced flows out from the exhaust hood upper part flow guides 40, and then it is introduced to a condenser 61 while flowing together with the other exhaust steam 32 on the downstream side of an exhaust hood exit 60.

As shown in FIGS. 5 and 6, the termination of each of the exhaust hood upper part flow guides 40 in the condenser direction is located at a position in the vicinity of the exhaust hood exit 60, but it may be located either on the upstream side or downstream side of the above-described position. Also, although the condenser 61 is illustrated only in FIGS. 5 and 6, and not particularly illustrated in the other figures, the turbine exhaust system according to the present invention is assumed to have the condenser 61 or a hookup shell for coupling the condenser 61 to the exhaust hood outer casing 5 each provided at a lower part of the turbine exhaust system.

As described above, out of exhaust steam heading for the condenser from the exhaust hood upper part flow guides 40, the high-loss annular plane upper part exhaust steam 30 can be completely separated from the other exhaust steam 32. Herein, since the exhaust steam introduction-side end faces 41 of the exhaust hood upper part flow guides 40 are provided further toward the upper side than the horizontal plane 20 containing the central axis 21 of the turbine rotor, exhaust steam in the vicinity of the horizontal plane 20 which exhaust steam should be introduced into the condenser with a small flow loss unless it is mingled with the annular plane upper part exhaust steam 30, can be separated from the annular plane upper part exhaust steam 30. Therefore, as compared with the case where exhaust steam is separated simply on the horizontal plane 20, the flow loss of the total exhaust steam can significantly be reduced. Particularly in this embodiment, since the exhaust steam introduction-side end faces 41 of the exhaust hood upper part flow guides 40 are arranged along the planes 27 and 28 in FIG. 3, a flow with a particularly high loss, supplied with a vortical component along the meridian plane by traveling back and forth between the exhaust hood outer casing 5 and the exhaust hood inner casing 2, namely, the exhaust steam 30, can be separated from the other exhaust steam 32. Thus, by achieving more proper separation, an effective flow path cross-sectional area can be enlarged, resulting in more improved pressure recovery performance. This enables heat efficiency of the turbine and fluidic performance of exhaust steam to be dramatically enhanced.

According to this embodiment, it is possible to reduce separation of flow or drift due to a strong vortical flow caused by exhaust steam discharged from the annular plane upper part 29 as describe above, or mixing loss and/or vortex loss caused by the vortical flow itself, and thereby to promote pressure recovery and the formation of an uniform flow pattern in the vicinity of a condenser flange plane. With such a simple construction, this embodiment allows heat efficiency of the turbine and performance of the condenser to be significantly improved without extensively changing a size of the exhaust hood outer casing 5. Thus, simply by retrofitting an existing turbine exhaust system with the exhaust hood upper part flow guides 40, the existing turbine exhaust system can be advantageously and easily modified as the turbine exhaust system according to this embodiment.

Furthermore, in this embodiment, since the annular plane upper part exhaust steam 30 and the other exhaust steam 32 can be properly separated from each other, a sufficient effect can be achieved only by dividing exhaust steam discharged from the flow guide 6 into two the lines by the exhaust hood upper part flow guides 40 functioning as a single entity, without the need to divide the number of flow paths of the exhaust steam discharged from the flow guide 6 into a number more than necessary. An increase in the number of flow paths of exhaust steam correspondingly increases the number of support structures in the exhaust flow paths, which not only complicates the construction but also increases resistance of flow paths. Therefore, it is preferable that the number of structures in the exhaust flow paths be as small as possible. In this embodiment, a significant enhancement of performance can be beneficially realized only by retrofitting the exhaust hood upper part flow guides 40, which are the fewest possible support structures.

Figure 10:
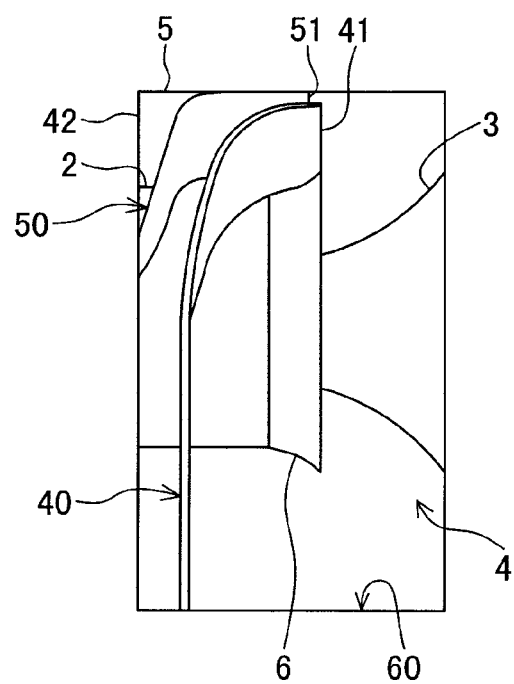
FIG. 10 is a perspective side view showing the detailed construction of the turbine exhaust system according to a second embodiment of the present invention.
Figure 11:
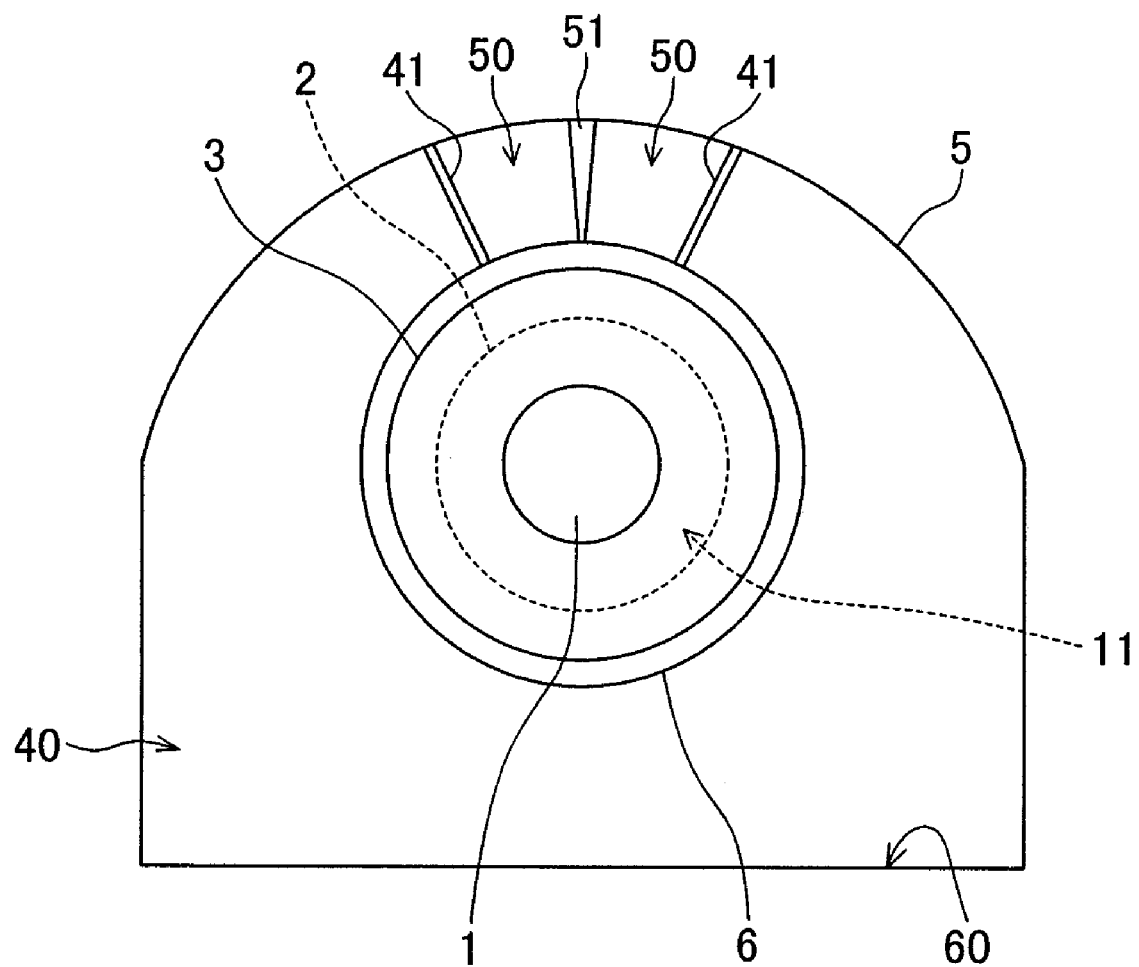
FIG. 11 is a perspective front view showing a detailed construction of the turbine exhaust system according to the second embodiment of the present invention.
Figure 12:
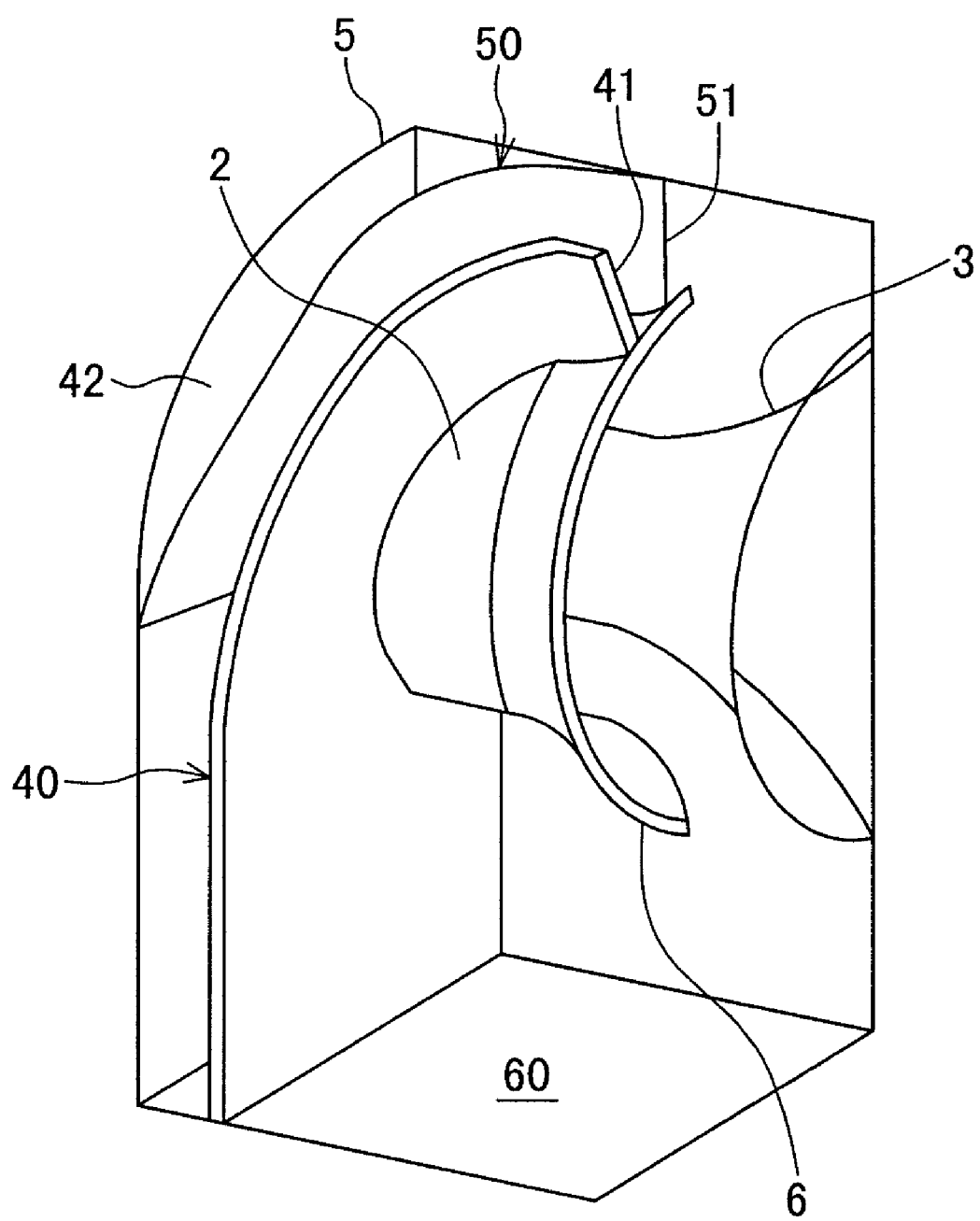
FIG. 12 is a perspective view showing the detailed construction of a half part of the turbine exhaust system according to the second embodiment of the present invention, the half part being obtained by dividing the turbine exhaust system by a vertical plane containing the central axis of the turbine.

FIG. 10 is a perspective side view showing a detailed construction of a turbine exhaust system according to a second embodiment of the present invention; FIG. 11 is a perspective front view thereof; and FIG. 12 is a perspective view of a half part of the turbine exhaust system, the half part being obtained by dividing the turbine exhaust system by a vertical plane containing the central axis of the turbine. In these drawings, the same parts as those in FIGS. 1 to 9 are designated by the same reference numerals, and descriptions thereof are omitted.

The turbine exhaust system according to this embodiment further has second exhaust hood upper part flow guides 50 each of which has an exhaust steam introduction-side end face 51 located further toward the upper side than the exhaust hood upper part flow guides 40, and which is formed in a bent shape by patterning after the exhaust hood flow guide 40, in order to secure a flow path for allowing the annular plane upper part exhaust steam to pass between the exhaust hood flow guide 40 and the second exhaust hood upper part flow guide 50. Other constructions are the same as those in the first embodiment.

Each of the second exhaust hood upper part flow guides 50 is formed so that the flow path between the flow guides 40 and 50 depicts a smooth curve by covering a corner portion at the upper part of the rear end face 42 of the exhaust hood outer casing 5 with a curved surface. While the exhaust steam introduction-side end faces 51 of the second exhaust hood upper part flow guides 50 are provided at two places in the exhaust hood upper half part, and they are disposed in the vicinity of the vertical plane containing the turbine central axis, it is necessary to prevent a clearance gap into which exhaust steam to enter, from occurring between the two exhaust hood upper part flow guides 40. Thus, in this embodiment, all of the annular plane upper part exhaust steam is introduced into the smooth exhaust flow paths formed between the exhaust hood upper part flow guides 40 and 50, which have a two-stage configuration in the turbine axial direction.

Needless to say, this embodiment produces an effect similar to that of the first embodiment. In addition, this embodiment allows a reduction in resistance of the flow path at the corner portion in the upper part of the rear end face 42 of the exhaust hood upper half part to thereby smooth flow of the annular plane upper part exhaust steam, thus promising to produce even more effect. Furthermore, even when attempting to modify an existing turbine exhaust system as the turbine exhaust system according to this embodiment, it suffices only to retrofit the existing system with the exhaust hood upper part flow guides 40 and 50.

As described above, the annular plane upper part exhaust steam is supplied with a vertical component along the meridian plane while traveling back and forth between the exhaust hood outer casing 5 and the exhaust hood inner casing 2. Therefore, if this back-and-forth traveling can be inhibited, even more pressure recovery performance can be expected. One possible method for achieving that would be to form each of the exhaust hood upper part flow guides 40 by a duct that passes through a position spaced apart from the exhaust hood inner casing 2 and that heads for the condenser while depicting a smooth curve, to thereby prevent exhaust steam from bouncing off the exhaust hood inner casing 2. In this case, it is desirable that the curvature of this duct-shaped flow path be reduced to a minimum for preventing collision of exhaust steam against a pipe wall in the flow path as much as possible, to inhibit the occurrence of abrupt turnabout of flow. Where feasible, it is also advisable to form a duct-shaped flow path that partly runs off the edge of the exhaust hood outer casing 5.

What is claimed is:

1. An exhaust hood structure of a steam turbine comprising:
    an inner casing that has turbine stages installed on an inner peripheral part thereof;
    an annular diffuser that is installed to an exit of a final stage moving blade of the inner casing;
    an outer casing that covers the inner casing and the diffuser; and
    an exhaust hood upper part flow guide that is installed between the inner casing and the outer casing, and that separates annular plane upper part exhaust steam that flows within a range including vertical upward flow out of exhaust steam discharging from the diffuser, from other exhaust steam,
    wherein exhaust steam introduction-side end faces that are upstream side end faces of the exhaust hood upper part flow guide in the exhaust steam flow direction, are located further toward an upper side than a horizontal plane containing a central axis of the steam turbine.

2. The exhaust hood structure of a steam turbine according to claim 1, wherein
    the exhaust hood upper part flow guide comprises two upper part guide plates provided on an upper part of an outer peripheral part of the inner casing and the diffuser, and a lower part guide plate provided on a lower part of the outer casing,
    wherein the upper part guide plates are configured so as to extend toward the inner casing from the diffuser and thereafter bend in a downward direction, the upper part guide plates extend outward in a turbine radial direction and come into contact with the outer casing, and
    wherein the lower part guide plate is connected to the two upper part guide plates and divides an interior space of the outer casing into two parts in a turbine axial direction.

3. The exhaust hood structure of a steam turbine according to claim 1, wherein the exhaust steam introduction-side end faces of the exhaust hood upper part flow guide are disposed along a plane that contains intersection lines between vertical planes tangent to an outer peripheral part of the final stage moving blade exit annular plane of the turbine stages and parallel to the central axis of the steam turbine and the exhaust steam hood outer casing, and a central axis of the turbine rotor.

4. The exhaust hood structure of a steam turbine according to claim 2, wherein the exhaust steam introduction-side end faces of the exhaust hood upper part flow guide are disposed along a plane that contains intersection lines between vertical planes tangent to an outer peripheral part of the final stage moving blade exit annular plane of the turbine stages and parallel to the central axis of the steam turbine and the exhaust steam hood outer casing, and a central axis of the turbine rotor.

5. The exhaust hood structure of a steam turbine according to claim 1, wherein the exhaust hood upper part flow guide is a partition wall formed so as to divide an exhaust flow path between the exhaust hood outer casing and the diffuser into two exhaust flow path lines that allow the annular plane upper part exhaust steam and the other exhaust steam to pass through, individually, in order to prevent the annular plane upper part exhaust steam from interfering with the other exhaust steam.

6. The exhaust hood structure of a steam turbine according to claim 1,
    wherein the exhaust hood upper part flow guide is arranged along with an outer peripheral part of the diffuser and the exhaust hood inner casing, and
    wherein the exhaust hood upper part flow guide is configured so as to extend toward the exhaust hood inner casing from the diffuser, with the exhaust steam introduction-side end face as a starting end, and thereafter bend in a downward direction.

7. The exhaust hood structure of a steam turbine according to claim 6, further comprising:
    second exhaust hood upper part flow guides, each of which has an exhaust steam introduction-side end face located further toward the upper side than the exhaust hood upper part flow guides, and each of which is formed in a bent shape by patterning after the exhaust hood flow guide, in order to secure a flow path for allowing the annular plane upper part exhaust steam to pass between the exhaust hood flow guide and the second exhaust hood upper part flow guide.

8. A method for modifying a steam turbine that includes an inner casing that has turbine stages installed on an inner peripheral part thereof; an annular diffuser that is installed to an exit of a final stage moving blade of the inner casing; and an outer casing that covers the inner casing and the diffuser, the method comprising:
    retrofitting the steam turbine with an exhaust hood upper part flow guide that separates annular plane upper part exhaust steam that flows within a range including vertical upward flow out of exhaust steam discharging from the diffuser, from other exhaust steam, the exhaust hood upper part flow guide that comprises two upper part guide-plates provided on an upper part of an outer peripheral part of the inner casing and the diffuser, and a lower part guide plate provided on a lower part of the outer casing,
    wherein the upper part guide plates are configured so as to extend toward the inner casing from the diffuser and thereafter bend in a downward direction, and the upper part guide plates extend outward in a turbine radial direction and come into contact with the outer casing,
    wherein the lower part guide plate is connected to the two upper part guide plates and divides an interior space of the outer casing into two parts in a turbine axial direction, and
    wherein exhaust steam introduction-side end faces that are upstream side end faces of the exhaust hood upper part flow guide in the exhaust steam flow direction, are located further toward an upper side than a horizontal plane containing a central axis of the steam turbine.

* * * * *